Nov. 20, 1923.　　　　　　　L. P. HALLADAY　　　　　1,474,964
SHOCK ABSORBER
Filed Dec. 11, 1920　　　　2 Sheets-Sheet 1
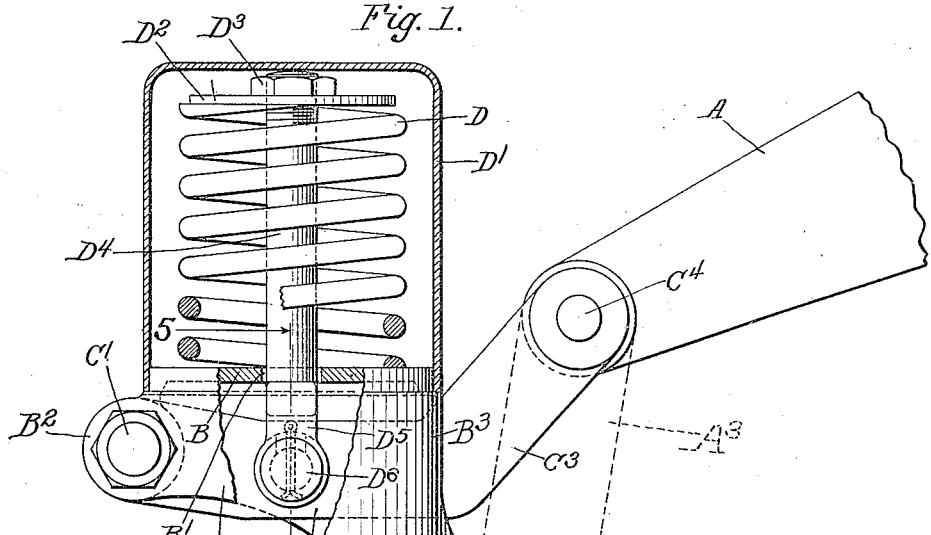
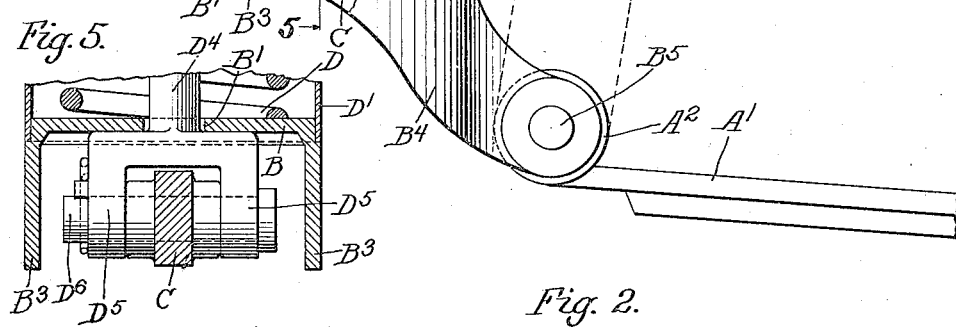
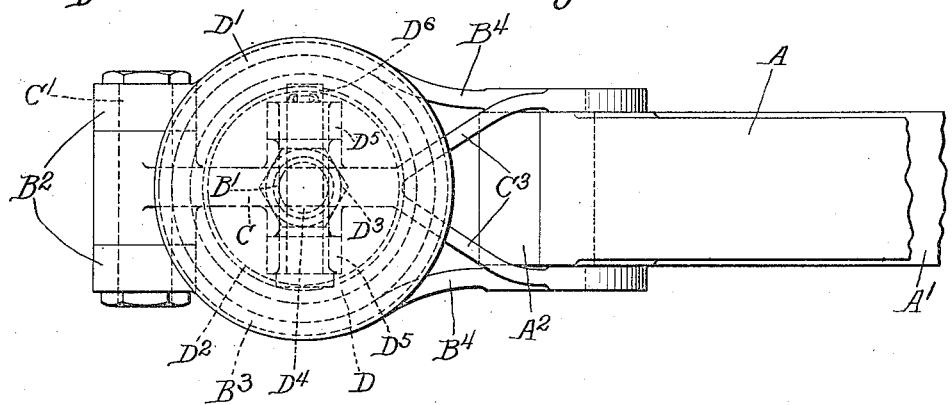
Witness
Edward T. Wray
Inventor
Lewis P. Halladay
by Parker & Carter
Attorneys Nov. 20, 1923.  L. P. HALLADAY  1,474,964
SHOCK ABSORBER
Filed Dec. 11, 1920   2 Sheets-Sheet 2

Patented Nov. 20, 1923.

1,474,964

UNITED STATES PATENT OFFICE.

LEWIS P. HALLADAY, OF DECATUR, ILLINOIS.

SHOCK ABSORBER.

Application filed December 11, 1920. Serial No. 429,850.

*To all whom it may concern:*

Be it known that I, LEWIS P. HALLADAY, a citizen of the United States, residing at Decatur, in the State of Illinois, have invented a certain new and useful Improvement in Shock Absorbers, of which the following is a specification.

My invention relates to improvements in shock absorbers or auxiliary spring suspensions for motor vehicles, particularly for such vehicles having the ordinary type of spring suspension, such as semi-elliptic or ¾ elliptic, and wherein the flat leaf springs are themselves perpendicular to the vehicle axis.

My invention is illustrated more or less diagrammatically in the accompanying drawings, wherein—

Fig. 1 is a side elevation partly sectional shown applied to a semi-elliptic spring suspension;

Fig. 2 is a plan view of the device shown in Fig. 1;

Fig. 5 is a detail section along the line 5—5 of Fig. 1;

Like parts are illustrated by like characters in the drawings.

A is the rear frame horn of an automobile or other vehicle. A' is the rear end of a semi-elliptic spring, terminating in a spring eye $A^2$. If my invention were not used the spring eye $A^2$ and the rear end of the frame would be connected by a link $A^3$ which for purposes of illustration I have shown in dotted lines.

B is a spring platform apertured at B' and having on its outer side the two spaced pivot lugs $B^2$. Downwardly projecting from the platform B are the curved flanges $B^3$ which terminate in lever arms $B^4$ $B^4$ which extend forwardly and downwardly to engage the spring eye $A^2$ being pivoted thereon by the pin $B^5$.

C is a lever pivoted on the pin C' in the lugs $B^2$ and extending across beneath the platform B. It is bifurcated at $C^3$ to engage the rear end of the frame A where it is pivoted on the pin $C^4$.

D is a coil spring resting on the platform B, enclosed in the housing D' and supporting by means of the washer $D^2$ and nut $D^3$ the supporting pin $D^4$ which passes down through the aperture B' and is bifurcated at $D^5$ to straddle the lever C on which it is pivoted by the pin $D^6$.

Figure 3:
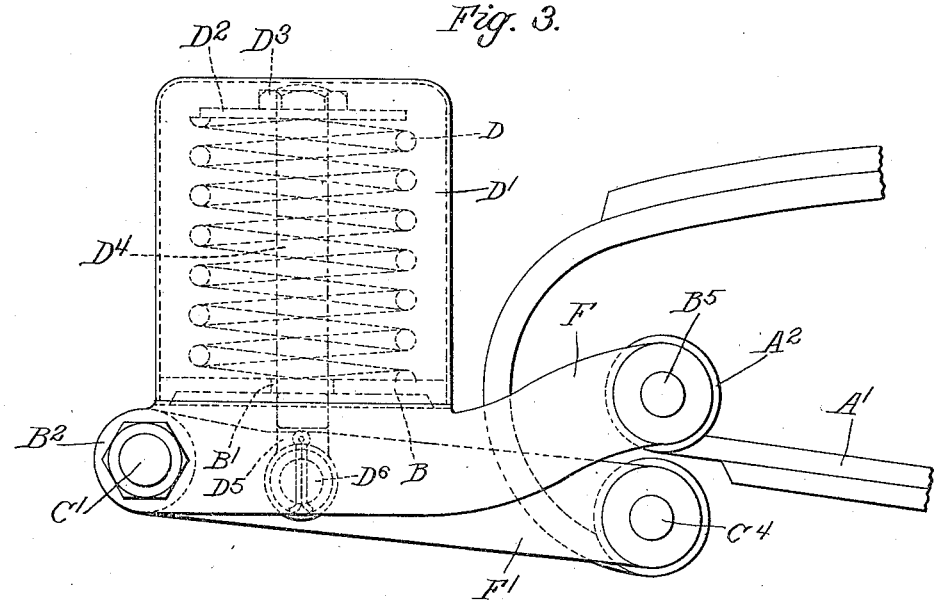
Fig. 3 is a side elevation of a modified form adapted to a ¾ elliptic suspension.
Figure 4:
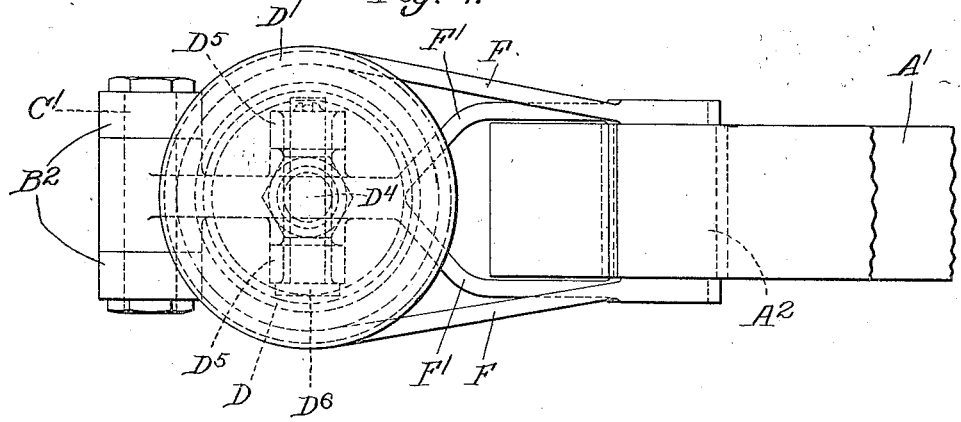
Fig. 4 is a plan view of the device shown in Fig. 3.

The modified form shown in Figs. 3 and 4 is the same in principle except that it is adapted to use with springs having scroll ends wherein to escape contact with the scroll the levers F and F' are lengthened to bring the auxiliary spring platform further back as shown.

It will be evident that while I have shown in my drawings an operative form of my device yet the drawings are to be regarded as in a sense diagrammatic.

The use and operation of my invention are as follows:

My device is assembled before using in the exact relation as shown with the coil spring under an initial tension being limited in its expansion by the engagement of the forked lower end of the suspension rod with the bottom of the auxiliary spring platform.

The links which when my device is not used join the spring eyes will be removed the car being blocked up in the usual manner for that purpose and the two ends of my levers are attached by the use of the original spring bolts respectively to the upper and lower spring eyes. The blocking is then removed and as the weight of the car settles down the two levers are forced apart compressing the coil spring until the resistance is great enough to hold.

The result of this arrangement is that the levers and coil spring form what is in effect a flexible or elastic connecting link between the spring parts; and the superior flexibility and sensitiveness of the coil spring, causes this flexible connection to come into operation in the usual way to absorb or cushion such light shocks as might be slightly if at all cushioned by the leaf springs.

I claim:

1. A shock absorber comprising a floating spring platform, a pivot connection between it and one of the spring elements of a vehicle, an auxiliary spring resting upon the platform, and a lever pivoted on the spring platform having its free end in pivotal connection with the end of one opposed vehicle spring element, and a plunger rod passing through the platform and pivoted at an intermediate point on the lever and supported at its upper end by the auxiliary spring.

2. A shock absorber comprising a floating spring platform, a pivot connection between it and one of the spring elements of a vehicle, an auxiliary spring resting upon the platform, and a lever pivoted on the spring platform having its free end in pivotal connection with the end of one opposed vehicle spring element, and a plunger rod passing through the platform and pivoted at an intermediate point on the lever and supported at its upper end by the auxiliary spring, the spring and plunger rod being located between the ends of the spring elements and the fulcrum of the plunger rod on the platform.

3. A shock absorber comprising a spring platform and a spring supported thereon, spaced lever arms integral with and extending downwardly from the platform, a lever pivoted on and located beneath the platform and between the spaced integral lever arms, a plunger rod pivoted at an intermediate point on said lever extending up through the platform, and supported at its upper end on the spring.

4. A shock absorber comprising two levers pivoted together at their outer ends and having their free ends attached respectively to the ends of two opposed vehicle supporting elements, said levers being located beyond the outer extending ends of said elements and their outer ends being adapted to lie in substantially the same horizontal plane, and means for yieldingly resisting the separation of the ends of said levers comprising a spring supporting platform integral with one of said levers and a spring supported thereupon, a plunger rod pivoted on the other lever at a point intermediate its ends and a connection between said pivoted rod and the outer end of said spring.

5. An auxiliary spring for vehicles adapted for use with opposed leaf springs, comprising an extension from one of said springs, an apertured platform mounted thereon, a supplemental spring seated on said platform and means for compressing said supplemental spring, comprising a link connected to the top of said spring and passing through said platform and a lever pivoted to said link, the outer end of the lever being pivoted to such extension and the inner end of said lever being pivoted to the opposed leaf spring.

Signed at Chicago, county of Cook, and State of Illinois, this 6th day of December, 1920.

LEWIS P. HALLADAY.